US008622810B2

(12) United States Patent
Yoshimi

(10) Patent No.: US 8,622,810 B2
(45) Date of Patent: *Jan. 7, 2014

(54) GAMING MACHINE WITH REPLACEMENT OF RUNS OF SYMBOLS CONTAINING IDENTICAL SYMBOLS WITH NEW IDENTICAL SYMBOLS

(71) Applicant: Konami Gaming, Inc., Las Vegas, NV (US)

(72) Inventor: Osamu Yoshimi, Botany (AU)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,439

(22) Filed: Nov. 26, 2012

(65) Prior Publication Data

US 2013/0084945 A1 Apr. 4, 2013

Related U.S. Application Data

(63) Continuation of application No. 13/316,025, filed on Dec. 9, 2011, now Pat. No. 8,366,540, which is a continuation of application No. 11/299,009, filed on Dec. 9, 2005, now Pat. No. 8,096,869.

(30) Foreign Application Priority Data

Feb. 14, 2005 (AU) ................................ 2005900681

(51) Int. Cl.
*A63F 9/24* (2006.01)
*A63F 13/00* (2006.01)

(52) U.S. Cl.
USPC .................................. 463/20; 463/16; 463/29

(58) Field of Classification Search
USPC ................ 463/16–20, 25, 29; 273/138.1, 139
See application file for complete search history.

(56) References Cited

U.S. PATENT DOCUMENTS 4,448,419 A 5/1984 Teinaes
5,152,529 A 10/1992 Okada (Continued)

FOREIGN PATENT DOCUMENTS

AU 768153 1/2002
AU 2002301067 B2 6/2003

(Continued)

OTHER PUBLICATIONS

International Search Report (Date of Mailing Apr. 22, 2005).

(Continued)

*Primary Examiner* — Milap Shah
(74) *Attorney, Agent, or Firm* — Howard & Howard Attorneys PLLC

(57) ABSTRACT

A gaming machine comprising a processor configured to execute a game displaying a matrix of symbol containing elements having a plurality of rows and a plurality columns; at least one column of said matrix comprising a portion of a simulated rotatable reel of a plurality of said symbol containing elements; said simulated rotatable reel comprising sections of symbol containing elements displaying a plurality of symbols; said simulated rotatable reel including at least one section in which a consecutive run of two or more of said symbol containing elements is populated by a first identical symbol so that, said first identical symbol being used for a first play of said game, a second identical symbol being randomly selected, the first identical symbol being replaced by the second identical symbol in said consecutive run of two or more of said symbol containing elements, said second identical symbol being used for a second play of said game.

15 Claims, 7 Drawing Sheets

(56) References Cited

U.S. PATENT DOCUMENTS

| | | | | |
|---|---|---|---|---|
| 5,395,111 | A | 3/1995 | Inoue | |
| 5,580,055 | A | 12/1996 | Hagiwara | |
| 5,609,524 | A | 3/1997 | Inoue | |
| 5,611,535 | A | 3/1997 | Tiberio | |
| 5,624,119 | A | 4/1997 | Leake | |
| 5,722,891 | A | 3/1998 | Inoue | |
| 5,752,881 | A | 5/1998 | Inoue | |
| 5,807,172 | A | 9/1998 | Piechowiak | |
| 5,976,016 | A | 11/1999 | Moody et al. | |
| 5,984,781 | A | 11/1999 | Sunaga | |
| 6,007,066 | A | 12/1999 | Moody | |
| 6,056,642 | A | 5/2000 | Bennett | |
| 6,159,096 | A | 12/2000 | Yoseloff | |
| 6,227,971 | B1 | 5/2001 | Weiss | |
| 6,241,607 | B1 | 6/2001 | Payne et al. | |
| 6,309,299 | B1 | 10/2001 | Weiss | |
| 6,319,124 | B1 | 11/2001 | Baerlocher et al. | |
| 6,394,902 | B1 | 5/2002 | Glavich et al. | |
| 6,439,993 | B1 | 8/2002 | O'Halloran | |
| 6,464,581 | B1 | 10/2002 | Yoseloff et al. | |
| 6,517,432 | B1 | 2/2003 | Jaffe | |
| 6,517,433 | B2 | 2/2003 | Loose et al. | |
| 6,544,120 | B2 | 4/2003 | Ainsworth | |
| 6,604,999 | B2 | 8/2003 | Ainsworth | |
| 6,644,664 | B2 | 11/2003 | Muir et al. | |
| 6,663,487 | B1 | 12/2003 | Ladner | |
| 6,726,204 | B2 | 4/2004 | Inoue | |
| 6,805,349 | B2 | 10/2004 | Baerlocher et al. | |
| 6,869,357 | B2 | 3/2005 | Adams et al. | |
| 6,880,826 | B2 | 4/2005 | Inoue | |
| 6,893,018 | B2 | 5/2005 | Inoue | |
| 6,896,615 | B2 | 5/2005 | Berman | |
| 6,905,408 | B2 | 6/2005 | Inoue | |
| 6,908,381 | B2 | 6/2005 | Ellis | |
| 6,910,962 | B2 | 6/2005 | Marks et al. | |
| 6,932,700 | B2 | 8/2005 | Bennett et al. | |
| 6,960,134 | B2 | 11/2005 | Hartl et al. | |
| 7,056,213 | B2 | 6/2006 | Ching et al. | |
| 7,179,166 | B1 | 2/2007 | Abbott | |
| 7,214,132 | B2 | 5/2007 | Inoue | |
| 7,237,775 | B2 | 7/2007 | Thomas et al. | |
| 7,252,589 | B1 | 8/2007 | Marks et al. | |
| 7,252,591 | B2 | 8/2007 | Van Asdale | |
| 7,311,602 | B2 | 12/2007 | Inoue | |
| 7,316,395 | B1 | 1/2008 | Kromydas | |
| 7,479,061 | B2 | 1/2009 | Okada | |
| 7,690,984 | B2 | 4/2010 | Tran et al. | |
| 8,096,869 | B2 * | 1/2012 | Yoshimi | 463/20 |
| 8,366,540 | B2 * | 2/2013 | Yoshimi | 463/20 |
| 2002/0039920 | A1 | 4/2002 | Bryant | |
| 2002/0123378 | A1 | 9/2002 | Bucknall et al. | |
| 2003/0013517 | A1 | 1/2003 | Bennett et al. | |
| 2003/0027611 | A1 | 2/2003 | Recard | |
| 2003/0087687 | A1 | 5/2003 | Locke et al. | |
| 2003/0134673 | A1 | 7/2003 | Moody | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0048646 | A1 | 3/2004 | Visocnik | |
| 2004/0053679 | A1 | 3/2004 | Getz et al. | |
| 2004/0058727 | A1 | 3/2004 | Marks et al. | |
| 2004/0063488 | A1 | 4/2004 | Berman | |
| 2004/0072610 | A1 | 4/2004 | White et al. | |
| 2004/0116175 | A1 | 6/2004 | Aida | |
| 2004/0198486 | A1 | 10/2004 | Walker et al. | |
| 2004/0219969 | A1 | 11/2004 | Casey et al. | |
| 2004/0266520 | A1 | 12/2004 | Aida | |
| 2005/0043083 | A1 | 2/2005 | Inoue | |
| 2005/0043084 | A1 | 2/2005 | Inoue | |
| 2005/0159208 | A1 | 7/2005 | Pacey | |
| 2005/0277460 | A1 | 12/2005 | Inoue | |
| 2006/0046830 | A1 | 3/2006 | Webb | |
| 2006/0052155 | A1 | 3/2006 | Inoue | |
| 2006/0084492 | A1 | 4/2006 | Baerlocher et al. | |
| 2006/0084498 | A1 | 4/2006 | Baerlocher et al. | |
| 2006/0166731 | A1 | 7/2006 | Yoshimi et al. | |
| 2006/0183533 | A1 | 8/2006 | Tran et al. | |
| 2006/0183534 | A1 | 8/2006 | Yoshimi | |
| 2006/0247002 | A1 | 11/2006 | Yoshimi et al. | |
| 2006/0287060 | A1 | 12/2006 | Yoshimi | |
| 2007/0015565 | A1 | 1/2007 | Chan | |
| 2007/0270203 | A1 | 11/2007 | Aida | |
| 2008/0045300 | A1 | 2/2008 | Quayle et al. | |
| 2008/0045323 | A1 | 2/2008 | Berman | |
| 2009/0082087 | A1 | 3/2009 | Pacey et al. | |
| 2009/0227332 | A1 | 9/2009 | Yoshizawa | |

FOREIGN PATENT DOCUMENTS

| | | | |
|---|---|---|---|
| AU | 2004203045 | A1 | 7/2004 |
| JP | 6-246043 | A | 9/1994 |
| JP | 2002-325881 | A | 11/2002 |
| JP | 2003-236055 | A | 8/2003 |

OTHER PUBLICATIONS

Office Action for U.S. Appl. No. 11/281,258 (Notification Date Dec. 13, 2007).

Response to Office Action of Dec. 13, 2007 (dated Mar. 13, 2008) for U.S. Appl. No. 11/281,258.

Office Action for U.S. Appl. No. 11/413,707 (Notification Date Jan. 28, 2008).

* cited by examiner

GAMING MACHINE WITH REPLACEMENT OF RUNS OF SYMBOLS CONTAINING IDENTICAL SYMBOLS WITH NEW IDENTICAL SYMBOLS

CROSS-REFERENCE TO RELATED APPLICATION

This application is a continuation of U.S. patent application Ser. No. 13/316,025 filed on Dec. 9, 2011, now U.S. Pat. No. 8,366,540, issued on Feb. 5, 2013, which is a continuation of U.S. patent application Ser. No. 11/299,009 filed on Dec. 5, 2005, now U.S. Pat. No. 8,096,869, issued on Jan. 17, 2012, which claims priority to Australian Patent Application No. 2005900681, filed on Feb. 14, 2005, the disclosures of which are hereby incorporated by reference in their entirety.

BACKGROUND

The present invention relates to gaming machines for the playing of games of chance and, more particularly, to special features of games or feature games which may be offered on such machines.

Gaming, or poker machines, have become a major source of amusement and diversion in such places as clubs, hotels and casinos in many parts of the world.

Traditionally such machines were mechanical devices where a number of reels marked with a plurality of numbers or symbols could be made to spin randomly by the application of some mechanical input. If the subsequent patterns of numbers or symbols displayed on the reels, when these returned to a rest state, corresponded to predetermined patterns, the machine would provide a prize or payout. Generally such gaming machines have come to be regulated by government authorities as to their number and in the manner in which the machines must return a percentage of the monetary turnover to the players.

The introduction of electronics, computers and electronic graphical displays, has allowed a continual increase in the complexity and variations of gaming machines, games and displays while maintaining the basic concept of the traditional machine. Nevertheless, in some jurisdictions at least, government regulations effectively restrict the degree of variation which may be incorporated in games played on coin-freed machines.

Machines and games therefore that offer novel and stimulating variations on the basic game theme and environment, yet comply with these restrictions are eagerly sought by the gaming industry and there is consequently intense competition between machine manufacturers to innovate.

Games based on simulated rotatable reels typically display a matrix of elements each of which displays a symbol. Predetermined patterns of symbols, if displayed after the reels are spun and come to rest, may then award a prize to the player of the game. Typically also, the symbols are arranged in the elements of a reel so that adjoining elements do not display the same symbol.

An exception to this is found for example in Australian Patent Application number 2004203045 (Aristocrat Technologies Australia Pty Ltd), in which arrangements are envisaged where two special symbols may occur adjacent one to the other.

A similar exception is found in Australian Patent Application number 2002301067 (Stargames Corporation Limited), in which a specific symbol and the number of its occurrences in the display at the conclusion of a game sequence, is determinant of a win. As indicated in FIG. 2 of the specification, two such symbols may appear in adjoining elements of a reel.

Both these examples of the prior art allow for only a single predetermined or special symbol to take up such adjacent positions on a reel.

It is an object of the present invention to address or at least ameliorate some of the above disadvantages.

BRIEF DESCRIPTION OF INVENTION

Accordingly, in a first broad form of the invention, there is provided a gaming machine arranged to display a matrix of symbol containing elements; each column of said matrix comprising a portion of a simulated rotatable reel of said symbol containing elements; and wherein each of said symbol containing elements of at least one consecutive run of said symbol containing elements of at least one said reel is caused to display an identical symbol.

Preferably, said identical symbol is selected by a game controller from a subset of available symbols.

Preferably, each symbol of said subset of symbols is assigned a probability of selection.

Preferably, said matrix of elements is comprised of five columns and three rows of elements.

Preferably, said at least one said reel is a first left-most reel.

Preferably, each element of said first left-most reel other than elements of said at least one consecutive run of elements is populated by a random selection of said available symbols.

Preferably, said game controller selects one potential win element from each said reel.

Preferably, a prize is awarded to a player of a game on said gaming machine if a predetermined arrangement of said potential win elements is displayed on a pre-defined payline of said matrix of elements when a game sequence is concluded.

Preferably, elements of each of reels two, three, four and five are populated with a default random selection of said available symbols.

Preferably, each symbol of at least one pre-defined consecutive run of said elements of each of said reels two, three, four and five is adapted for potential modification from said default random selection of available symbols to a said identical symbol.

Preferably, said identical symbol is that symbol populating said consecutive run of elements of a leftwardly adjoining reel.

Preferably, said modification from said default random selection occurs within any one of said reels two, three, four or five, if a said win element of a preceding reel coincides with a said element of a consecutive run of elements of said preceding reel.

Preferably, each said reel, which includes said at least one consecutive run of identical symbols, is pre-spun at a relatively slow rate when a game sequence is initiated.

Preferably, all symbols of all elements of at least one said reel are identical.

Preferably, said gaming machine is a single display stand-alone gaming machine.

Preferably, said gaming machine is a stand-alone gaming machine provided with an upper secondary display.

Preferably, said gaming machine is one of a plurality of gaming machine linked to a progressive jackpot controller.

Preferably, said elements are N-sided elements; where N is a variable and values of N include N=1.

Preferably, said values of N include 4, 5, 6, 7, 8, 9, 10, 11, 12, 13, 14, 15, 16, 17, 18, 19 and 20.

Preferably, said N-sided elements are regular hexagons.

In a further broad form of the invention there is provided a method for increasing probability of a winning outcome on a gaming machine; wherein said winning outcome is determined by pre-defined arrangements of symbols displayed in a matrix of elements comprising portions of simulated rotatable reels; said method including the steps of:

(a) arranging at least of said simulated rotatable reels with at least one consecutive run of elements displaying an identical symbol; said identical symbol selected from a subset of available symbols.

(b) a game controller randomly selecting one element from each one of said simulated rotatable reels as a potential win element.

Preferably, said matrix of elements comprises three rows and five columns of said elements; said columns comprising portions of said rotatable reels.

Preferably, said identical symbol is selected from a look-up table of said subset of available symbols.

Preferably, said at least one of said simulated rotatable reels is a first left-most reel.

Preferably, all said elements of said reels, except said at least one consecutive run of elements displaying said identical symbol on said first left-most reel, display randomly selected symbols from said available symbols.

Preferably, reels other than said first left-most reels are each provided with at least one potential consecutive run of elements adapted for modification from said randomly selected symbols to a said identical symbol.

Preferably, said modification from said randomly selected symbols within said potential consecutive run of said reels other than said first left-most reel, occurs if said potential win element of a leftwardly preceding reel falls within a said consecutive run of elements of said leftwardly preceding reel.

In yet a further broad form of the invention there is provided a method of implementing a game on a gaming machine; said method including the steps of:

(c) providing said gaming machine with a control module; said module including a microprocessor, a working memory and a data storage device connection means, (d) writing program code to said data storage device, (e) connecting said data storage device to said control module.

In still a further broad form of the invention there is provided media for storing enabling digital code for playing games; said media comprising solid state data retaining devices including, read only memory (ROM) and erasable programmable read only memory (EPROM), compact flash cards and PCMCIA cards; said media further including disc-based storage devices.

BRIEF DESCRIPTION OF DRAWINGS

Embodiments of the present invention will now be described with reference to the accompanying drawings wherein.

DETAILED DESCRIPTION OF PREFERRED EMBODIMENTS

First Preferred Embodiment

Figure 1:
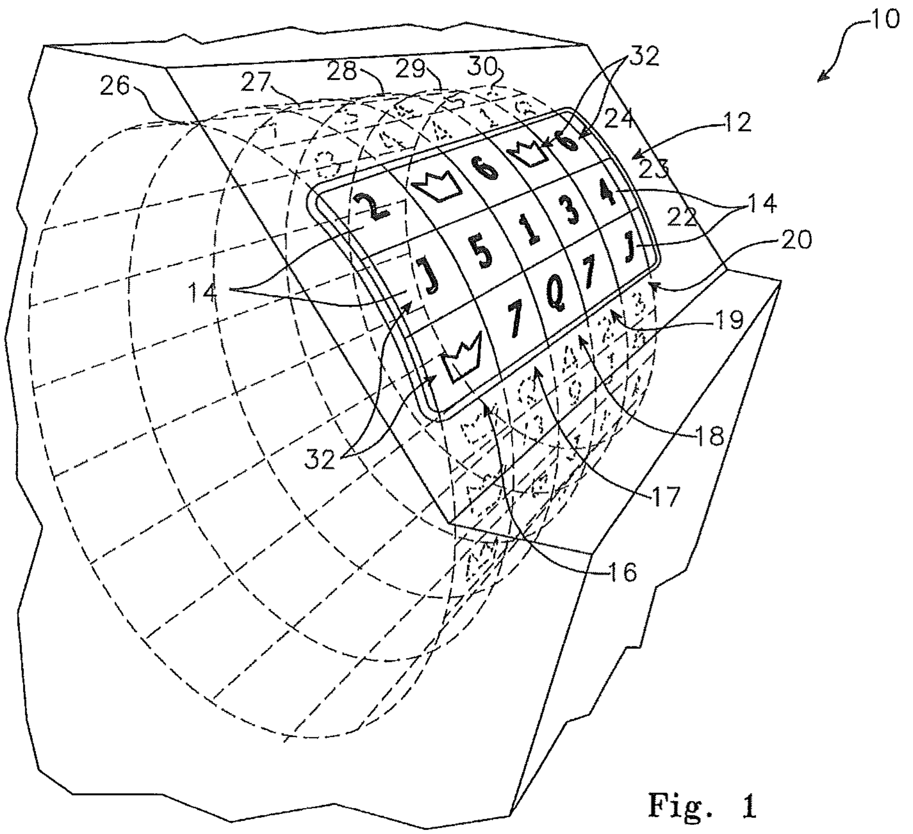
FIG. 1 is a partial view of a gaming machine with a display showing a matrix of elements and symbols comprising portions of simulated rotatable reels.
Figure 2:
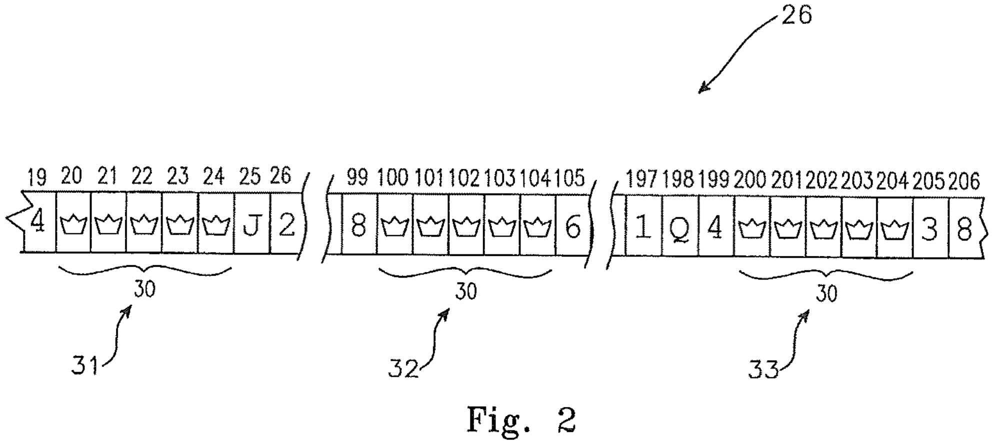
FIG. 2 is a schematic representation of the elements and symbols of portions of the first or left-most rotatable reel of FIG. 1.

With reference to FIGS. 1 and 2, a gaming machine 10 is provided with a display 12, showing portions of a number of adjoining simulated rotatable reels 26 to 30. Each reel is divided into a given number of elements, for example 256 elements. In this example, when rotatable reels 26 to 30 are at rest, the display shows a matrix of elements 14 in five columns, 16 to 20 and three rows, 22 to 24, so that each column comprises a three-element portion of the respective simulated rotatable reel. Each element 14 of simulated rotatable reels 26 to 30 is arranged to display a symbol 32. With some exceptions, as explained below, the sequence of symbols within the elements of a reel remains fixed for all games played.

A game controller (not shown) pre-selects at random, at the initiation of a game sequence, a potential win element for each reel from the set of elements. That is, the game controller predetermines which element, and therefore which symbol, will be displayed in a pay line position at the end of a game sequence, and may therefore contribute to a winning outcome.

In this first preferred embodiment of the invention, at least one reel, the first left-most reel, is arranged to have at least one run of an identical symbol in each of a number of consecutive elements. The arrangement is shown schematically in FIG. 2 where portions of the left-most reel 26 are shown in strip form and, for example, a run of kings (crown symbol) is arranged for display in runs of five consecutive elements 30 at three locations 31 to 33 respectively. The three runs of consecutive elements in this example are elements 20 to 24, 100 to 104 and 200 to 204, within the 256-element length of the strip. In this preferred embodiment, the number of elements in a run and the location of the consecutive run or runs within the strip are predetermined and remain constant for each game played on the machine. The identical symbol which populates these consecutive run or runs of elements may be considered as one of a set of “inner reel” symbols.

Figure 3:
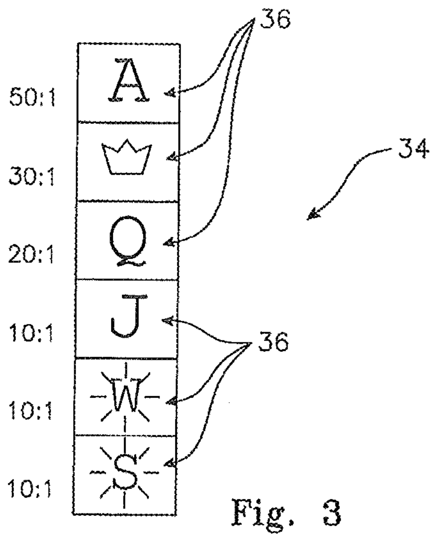
FIG. 3 is a schematic representation of an “inner reel” or look-up table.

The game controller (not shown) determines the identical symbol to be displayed in each consecutive element of the run or runs of consecutive elements in which the symbol is to be shown. The selection of the identical symbol is through a notional rotation of an “inner reel” 34 shown as a strip of elements and symbols in FIG. 3. This “inner reel” is in effect a look-up table and is not displayed, but its simulated rotation and “coming to rest” determines which symbol will populate the run or runs of consecutive elements of the left-most reel.

The symbols of the “inner reel” or look-up table from which the selection is made, are a sub-set of the set of symbols displayed in the remaining non-“inner reel” elements of the left-most reel. Thus, where the symbols are those of a suit of cards, the “inner reel” symbols may be those of the Ace, King, Queen and Jack, sometimes called the trump or court cards. The look-up table could also include a "wild" or "scatter" symbol. As previously noted, the arrangement or ordering of the symbols in the elements of the reel, other than the consecutive run or runs of elements, remain constant for every game, only the selection of the identical symbol from the look-up table is performed anew for each new play of a game.

The symbols 36 of the look-up table 34 need not all have the same probability of selection but may be assigned a hierarchy of probability. Thus for example, those symbols for which a winning combination confers on the player of a game a relatively higher value prize, such as the ace and the king, may have an inversely proportional probability of being selected as an "inner reel" symbol.

The reels are now spun as normal. The player will notice the run or runs of identical symbols passing through the display 12 for each revolution of the left-most reel 26, thereby providing a heightening of interest, since the odds of a winning arrangement of symbols appearing on a pre-defined pay line in the matrix at the conclusion of the game sequence will be increased.

Second Preferred Embodiment

In a second preferred embodiment of the invention, the second reel, that is the second reel from the left in this example, may also be modified to include at least one run of consecutive elements displaying the same "inner reel" symbol as that used to populate the elements of the consecutive run or runs of the left-most reel. As for the first, left-most reel, the number and location of the consecutive elements of the potential run or runs within the strip of elements forming the simulated reel, is predetermined and remains constant.

Prior to modification, all the elements of the second reel (and likewise those of the third fourth and fifth reel) are randomly populated with symbols from the set of available symbols. Unless modification is triggered in the manner explained below, the ordering of these symbols within the elements of the reels remains constant for every game; only those symbols of the potential run or runs being displaced should a modifying event occur.

Figure 4A:
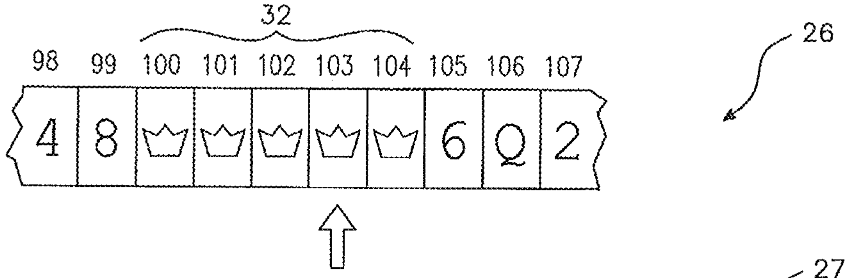
FIGS. 4A to 4C are schematic representations of portions of the reel of FIG. 2 and of the adjoining second reel for a particular game situation.
Figure 4B:
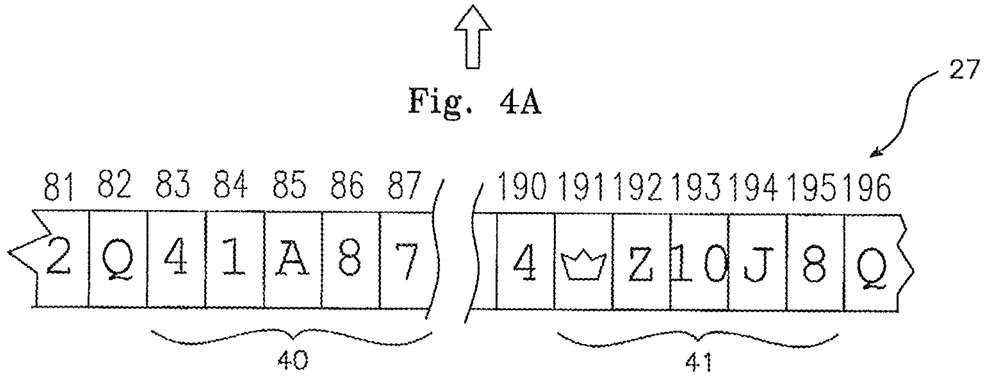
Figure 4C:
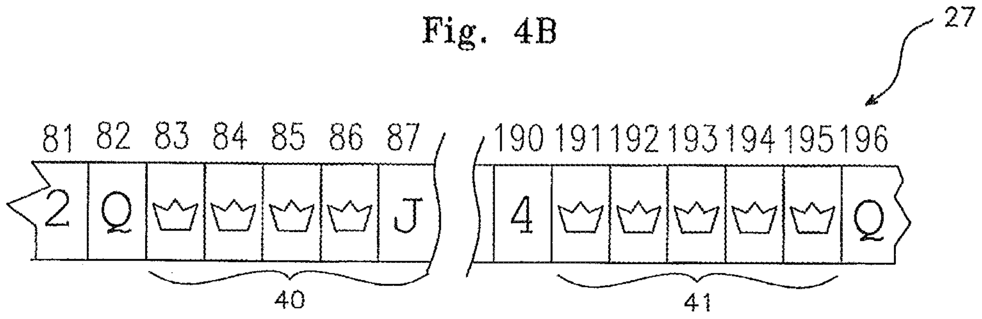

The populating of the potential "inner reel" elements of the second reel, and of any subsequent reels, is dependent on the potential win element for the first, or preceding reel, which was randomly selected by the game controller, lying within a run of consecutive elements of that reel. For example if, as shown in FIG. 4A, in the left-most reel 26, which has consecutive runs comprising the elements as numbered in the First Preferred Embodiment above, the potential win element selected is element number 103, the second reel 27 will be modified. Second reel 27 in this example has two potential runs 40 and 41 of consecutive "inner reel" elements, element numbers 83 to 87 and 191 to 195 respectively, which in a default state are randomly populated from the set of available symbols as shown in FIG. 4B. However, because the selected potential win element 103 of reel 26 falls within run 32, the potential "inner reel" elements 83 to 87 and 191 to 195 of reel 27 are replaced with the same identical symbol as used for the consecutive run or runs of the left-most reel 26 as shown in FIG. 4C.

A player will now discern a bias of symbols, (in our example crown symbols), in both the first, left-most, and second reels as these are spun during the play of a game. The effect is clearly an increase in the probability of a winning combination of symbols appearing along a pre-defined pay line within the matrix and consequently a raised level of interest in the outcome of the game for the player.

The same process of populating potential "inner reel" elements with the "inner reel" symbol of the preceding reel, may be sequentially applied to the third, fourth and fifth reels. As described for the second reel, the modification of a succeeding reel depends on the selected potential win element of the preceding reel falling within a run of "inner reel" elements of that reel.

Third Preferred Embodiment

In at least one preferred form of this embodiment, a player is made aware of the populating of one or more consecutive runs of the left-most reel with the identical symbol. This may be done prior to the main game sequence, for example, by a slower pre-spin of only the left-most reel. If any further reels are so populated, each may be pre-spun sequentially.

The displayed game rules and experience will alert a player to the fact that the potential winning element for a given reel is positioned somewhere within the run, or one of the runs of consecutive elements populated with the identical symbol if the second and any subsequent reels are also pre-spun to display a run or runs of that symbol. The player will appreciate that the probability of a winning combination occurring increases with each additional reel which is pre-spun to display its run or runs of elements with the same symbol.

Fourth Preferred Embodiment

The above described embodiments may be applied to a main game of a gaming machine or to a feature game offered as a result of some triggering event in a main game.

In a preferred embodiment of the invention as adapted for a feature game, the number of elements comprising a run of identical "inner reel" symbols and the number of such runs in any given reel is not constant but may be determined in a number of ways. Thus, in at least one preferred embodiment, the number of elements comprising a run may be a function of the amount of a bet placed by the player on the main game which triggered the feature game, or as a function of accumulated throughput of bets over a given time period. In one special case, all the elements of the first left-most reel may be populated by the same "inner reel" symbol.

Likewise, the number of runs in a given reel may be a function also of the betting pattern preceding the conferring of the feature game or alternatively, may be a function of the particular triggering event of the main game which led to the feature game.

Fifth Preferred Embodiment

Figure 5:
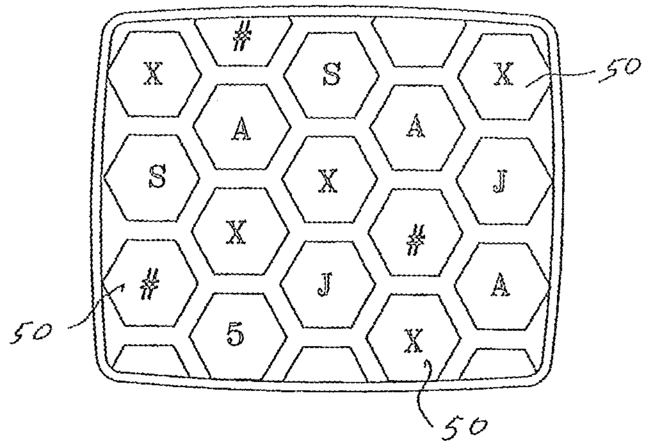
FIGS. 5 and 6 show examples of the display of FIG. 1 during play of a game using hexagonal elements.
Figure 6:
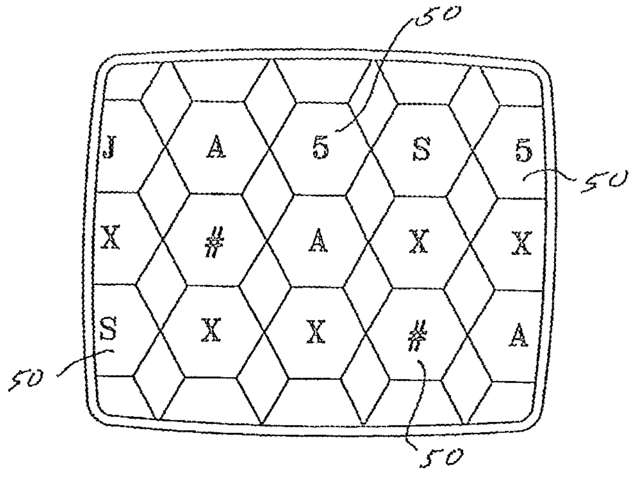

The elements comprising the matrix of elements of any of the above described embodiments may be of conventional rectangular configuration, but in at least one preferred embodiment the delineation of an element, that is, the boundary defining the field containing a symbol, may be any N-sided figure, where N may take the value 1 (thus a circular field) or any value from 3 to 20. In at least one preferred form of N-sided element, as shown in FIGS. 5 and 6, the elements 50 are hexagon shape for the value of N=6.

Game Implementation

Figure 7:
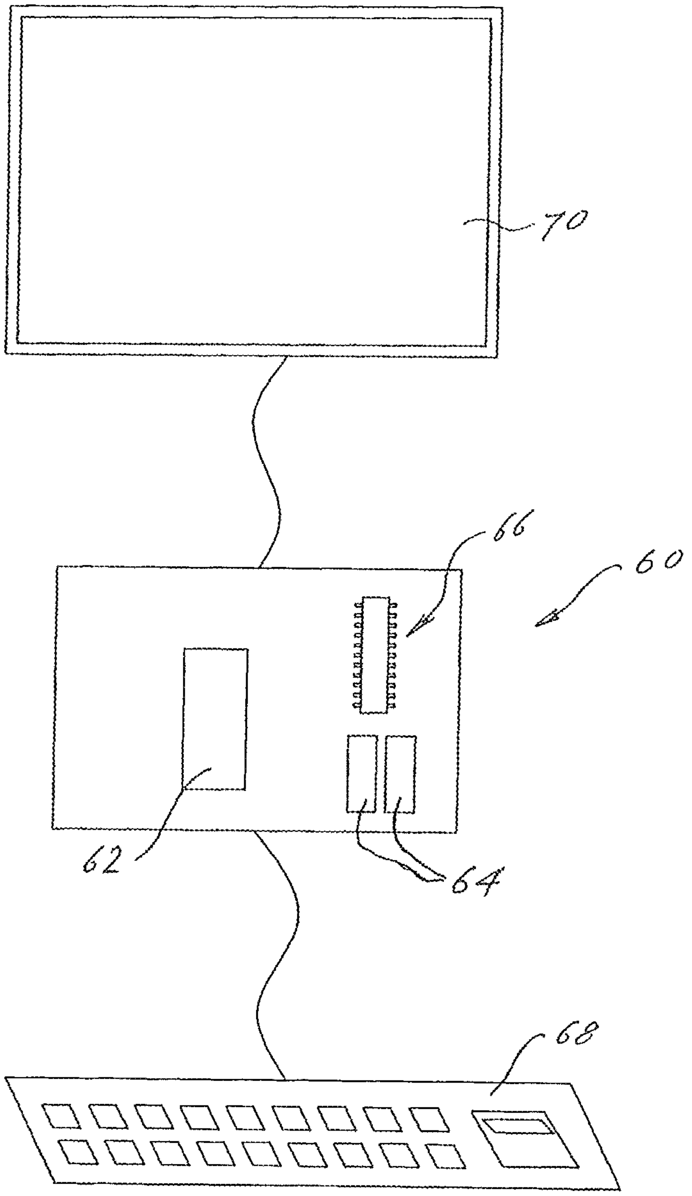
FIG. 7 is a schematic representation of a control module, input keyboard and display for implementing the game embodiments of FIGS. 3 to 9.

Any of the above described embodiments may be implemented on any gaming machine or group of gaming machine provided with a control module. As shown in FIG. 7, a control module 60 is provided with a microprocessor 62 and working random access memory (RAM) 64. The program code driving any of the described embodiments may be introduced into the control module 60 by connection of a data storage device 66. The device may take any of a number of forms, such as read only memory (ROM), erasable read only memory (EPROM), Compact Flash Card, PCMCIA card and the like. Alternatively, control module 60 may incorporate a hard disc drive to which the code may be written via a suitable input device.

Control module 60 acts to implement appropriate elements of the program code according to inputs from a user keyboard 68 and outputs video imagery to at least a main display module 70.

1. Stand-Alone Gaming Machines

Figure 8:
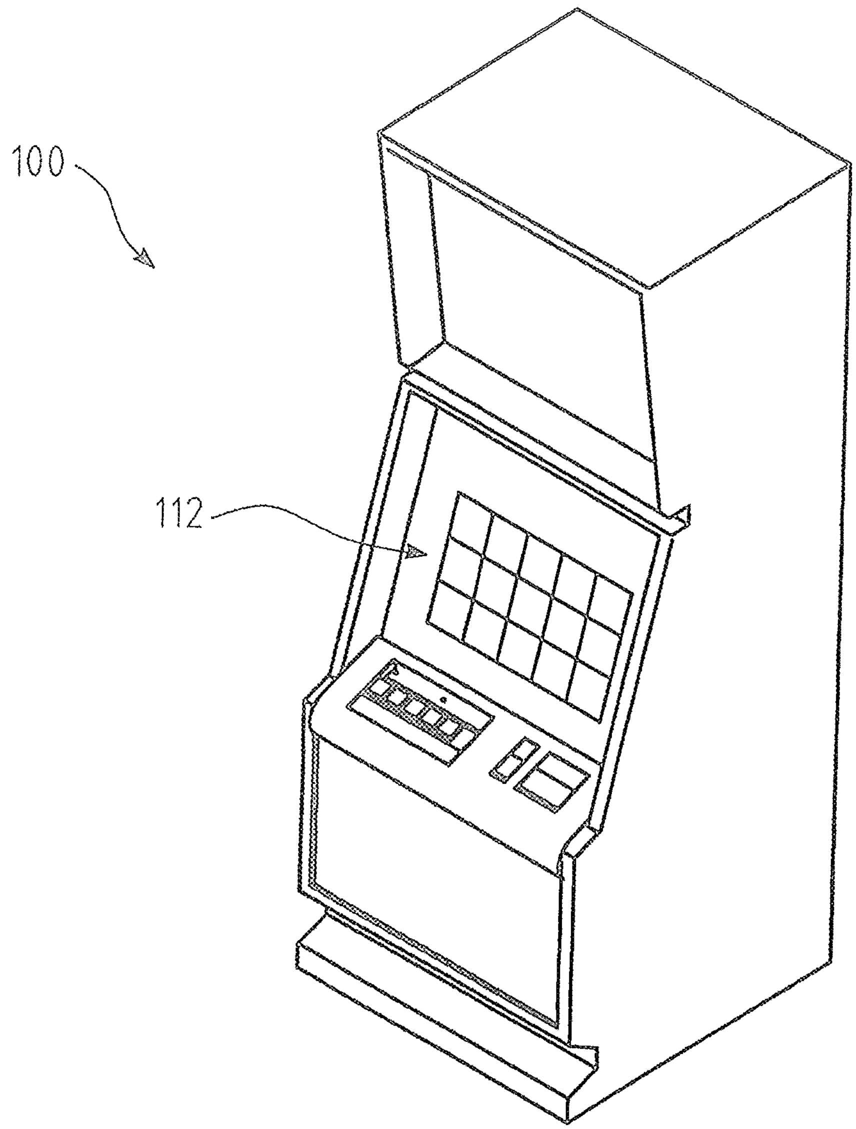
FIG. 8 is a perspective view of a stand-alone gaming machine with a single display unit.

As shown in FIG. 8, any of the above described embodiments for use on electronic display gaming machines may be incorporated into a stand-alone gaming machine 100 provided with a single display unit 112. In this implementation of games according to the invention, both main games and feature games (if offered) are displayed on the single display unit.

2. Stand-Alone Gaming Machines with Secondary Display Unit

Figure 9:
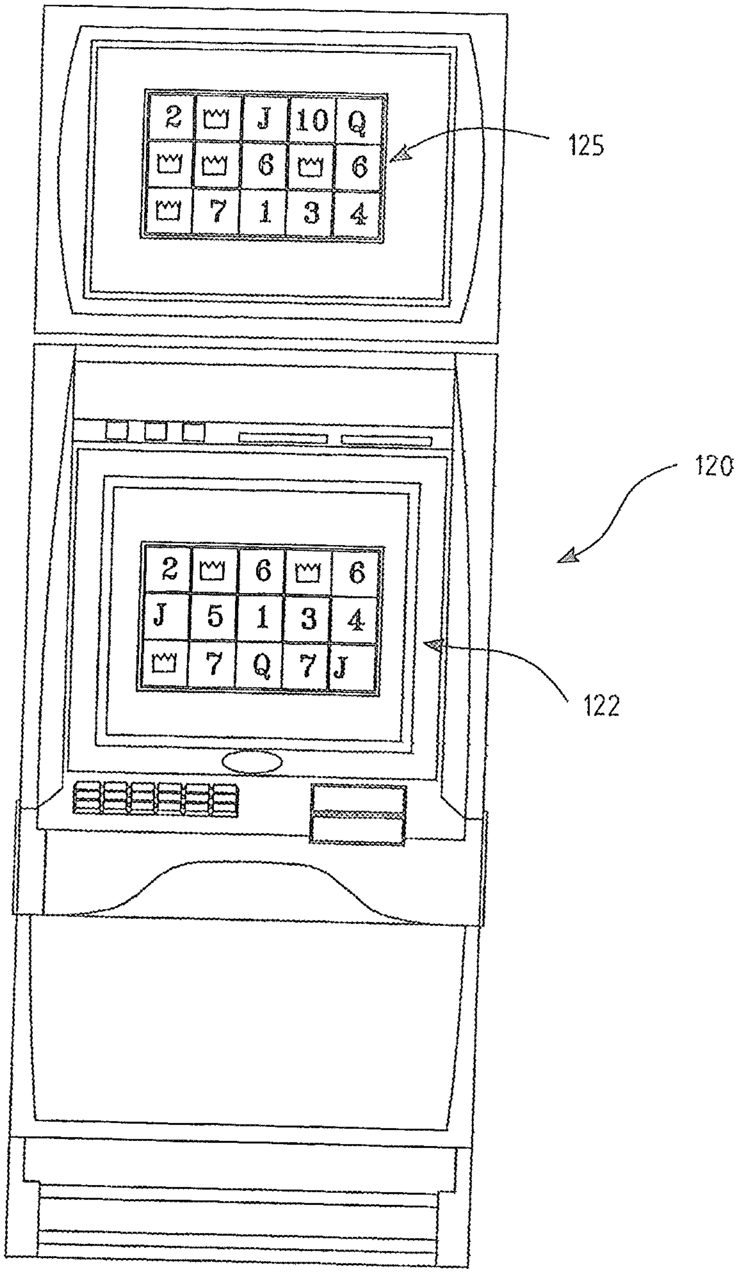
FIG. 9 is a front view of a stand-alone gaming machine with a main display and a secondary display unit.

In a further preferred embodiment of the invention as shown in FIG. 9, a stand-alone gaming machine 120 is provided with a secondary display unit 125 as well as a main display unit 122. In this embodiment the main game played on the primary display unit may take the form of either the first or second preferred embodiments described above. It is then a triggering event in the main game which offers a player a feature game as described in the third preferred embodiment above.

3. Gaming Machines Linked to Progressive Jackpot System

Figure 10:
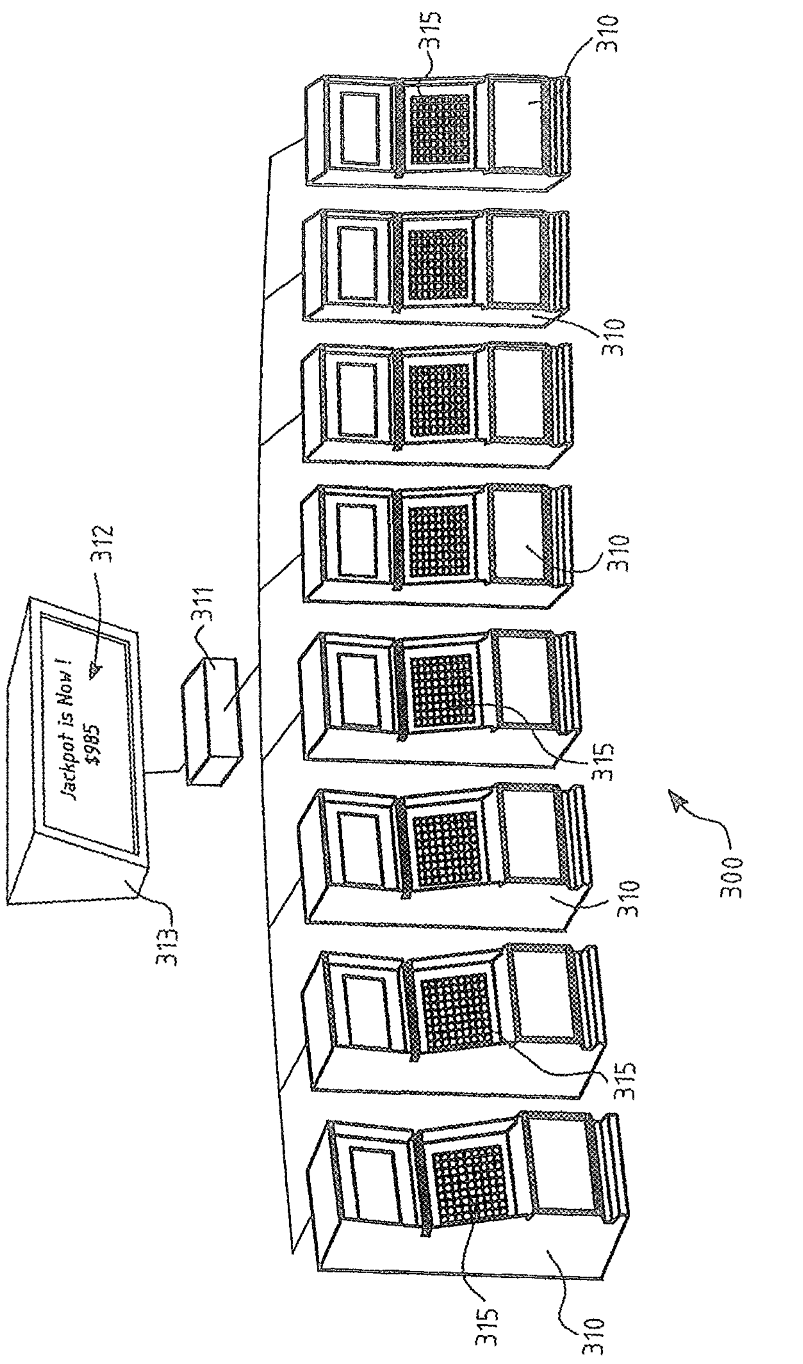
FIG. 10 is a perspective view of a number of the gaming machines of FIG. 8 or 9 when linked to a progressive jackpot system.

In yet a further preferred embodiment of the invention as shown in FIG. 10, a plurality of gaming machines 300 are arranged side by side in a line or arc so as to allow each of the players (not shown) of the machines to view a common jackpot prize display unit 313. Each individual machine 310 is provided with at least a main game display unit 315 for the playing of a main game according to the above described first and second embodiments.

Each of machines 310 of the embodiment illustrated in FIG. 7 is electronically linked to a jackpot control module 311 which monitors the volume of play on each of the linked machines and displays an incrementing jackpot value 312 determined according to the combined volume of play on the linked machines.

A win of the jackpot prize may be triggered by specific outcomes of either a main game or of a feature game. If the jackpot trigger is dependent on an outcome of the feature game, players on adjoining machines may be made aware by means of the common display that a potential triggering of the jackpot is to commence on the machine offered the feature game, thus adding interest for all the players.

It will be appreciated that the linked machines may form part of Local Area Networks (LAN) or Wide Area Networks (WAN).

What is claimed is:

1. A gaming machine comprising:

a memory device configured to store data representing a reel, the reel having a predetermined number of symbol positions, wherein each symbol position has an associated symbol from a set of symbols, the reel having a run of consecutive symbol positions, the run of consecutive symbol positions being initially populated with a first identical symbol from the set of symbols prior to initiation of a first instance of a game;

a display device configured to display a matrix having a plurality of display elements arranged in a column, the number of display elements in the column being less than the predetermined number of symbol positions in the reel, and the display device being further configured to display a portion of the reels such that the symbols associated with some of the symbol positions of the reel are displayed in the matrix when the reel is in a stop position; and a game controller configured to (i) initiate the first instance of a game using the reel, (ii) randomly select a second identical symbol from the set of symbols, (iii) replace each of the first identical symbols in the run of consecutive symbol positions of the reel with the second identical symbol, and (iv) initiate a second instance of the game using the reel having the run of consecutive symbol positions populated with the second identical symbol.

2. The gaming machine, as set forth in claim 1, wherein the second identical symbol is randomly selected by the game controller from a subset of the set of symbols.

3. The gaming machine, as set forth in claim 2, wherein each symbol of the subset of symbols is assigned a probability of selection.

4. The gaming machine, as set forth in claim 1, wherein the first identical symbol is randomly selected.

5. The gaming machine, as set forth in claim 1, wherein the reel is a first reel, the memory device further configured to store data representing second, third, fourth and fifth reels, wherein the matrix of elements is comprised of five columns and three rows of elements, each of the five columns being associated with a respective one of the reels.

6. The gaming machine, as set forth in claim 5, wherein the first reel is a left-most reel.

7. The gaming machine, as set forth in claim 1, wherein the reel is a virtual reel.

8. A method comprising:

storing data, in a memory device, representing a reel, the reel having a predetermined number of symbol positions, wherein each symbol position has an associated symbol from a set of symbols, the reel having a run of consecutive symbol positions, the run of consecutive symbol positions being initially populated with a first identical symbol from the set of symbols prior to initiation of a first instance of a game;

displaying, via a display device, a matrix having a plurality of display elements arranged in a column, the number of display elements in the column being less than the predetermined number of symbol positions in the reel, and display, via the display device, a portion of the reel such that the symbols associated with some of the symbol positions of the reel are displayed in the matrix when the reel is in a stop position;

initiating, via a game controller, the first instance of the game using the reel;

randomly selecting, via the game controller, a second identical symbol from the set of symbols;

replacing each of the first identical symbols in the run of consecutive symbol positions of the reel with the second identical symbol; and initiating a second instance of the game using the reel having the run of consecutive symbol positions populated with the second identical symbol.

9. The method, as set forth in claim 8, wherein the second identical symbol is randomly selected from a subset of the set of symbols.

10. The method, as set forth in claim 9, wherein each symbol of the subset of symbols is assigned a probability of selection.

11. The method, as set forth in claim 8, wherein the first identical symbol is randomly selected.

12. The method, as set forth in claim 8, wherein the reel is a first reel, the game further including second, third, fourth and fifth reels, wherein the matrix of elements is comprised of five columns and three rows of elements, each of the five columns being associated with a respective one of the reels.

13. The method, as set forth in claim 12, wherein the first reel is a left-most reel.

14. The method, as set forth in claim 8, wherein the reel is a virtual reel.

15. A non-transitory computer readable medium recording a program for controlling a computer to function as a:

a memory device configured to store data representing a reel, the reel having a predetermined number of symbol positions, wherein each symbol position has an associated symbol from a set of symbols, the reel having a run of consecutive symbol positions, the run of consecutive symbol positions being initially populated with a first identical symbol from the set of symbols prior to initiation of a first instance of a game;

a display device configured to display a matrix having a plurality of display elements arranged in a column, the number of display elements in the column being less than the predetermined number of symbol positions in the reel, and the display device being further configured to display a portion of the reels such that the symbols associated with some of the symbol positions of the reel are displayed in the matrix when the reel is in a stop position; and a game controller configured to (i) initiate the first instance of a game using the reel, (ii) randomly select a second identical symbol from the set of symbols, (iii) replace each of the first identical symbols in the run of consecutive symbol positions of the reel with the second identical symbol, and (iv) initiate a second instance of the game using the reel having the run of consecutive symbol positions populated with the second identical symbol.

* * * * *

UNITED STATES PATENT AND TRADEMARK OFFICE

CERTIFICATE OF CORRECTION

PATENT NO. : 8,622,810 B2
APPLICATION NO. : 13/685439
DATED : January 7, 2014
INVENTOR(S) : Osamu Yoshimi It is certified that error appears in the above-identified patent and that said Letters Patent is hereby corrected as shown below:

In the Specification

Column 1, lines 12-13: Please delete “Dec. 5, 2005” and replace with -- Dec. 9, 2005 --.

Signed and Sealed this
Second Day of September, 2014

Michelle K. Lee

Michelle K. Lee
*Deputy Director of the United States Patent and Trademark Office*